Aug. 4, 1959        J. H. ROUTLEDGE        2,897,791
CUSHIONING MEANS FOR HYDRAULIC ACTUATING MEANS
Filed Jan. 24, 1957        2 Sheets-Sheet 1
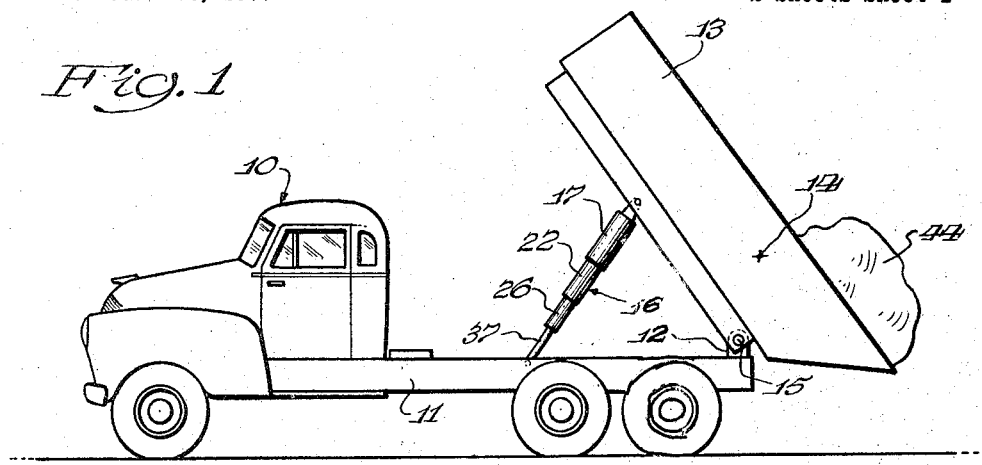
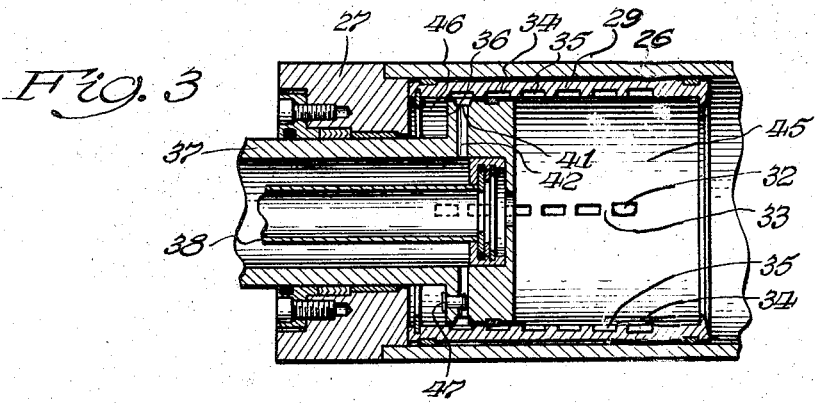
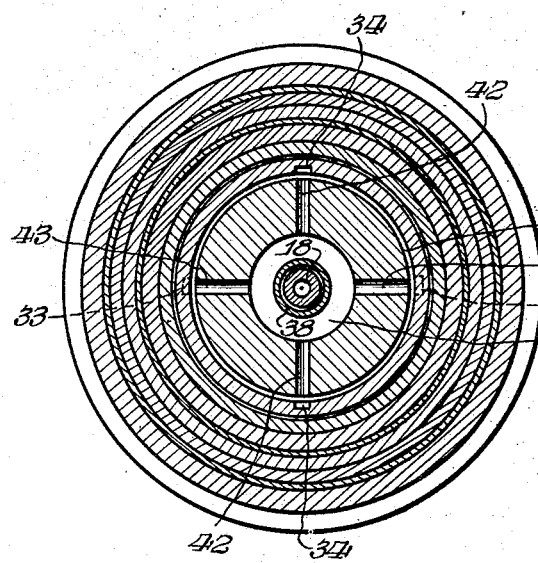
Inventor
James H. Routledge
Paul O. Pippel
Attorney

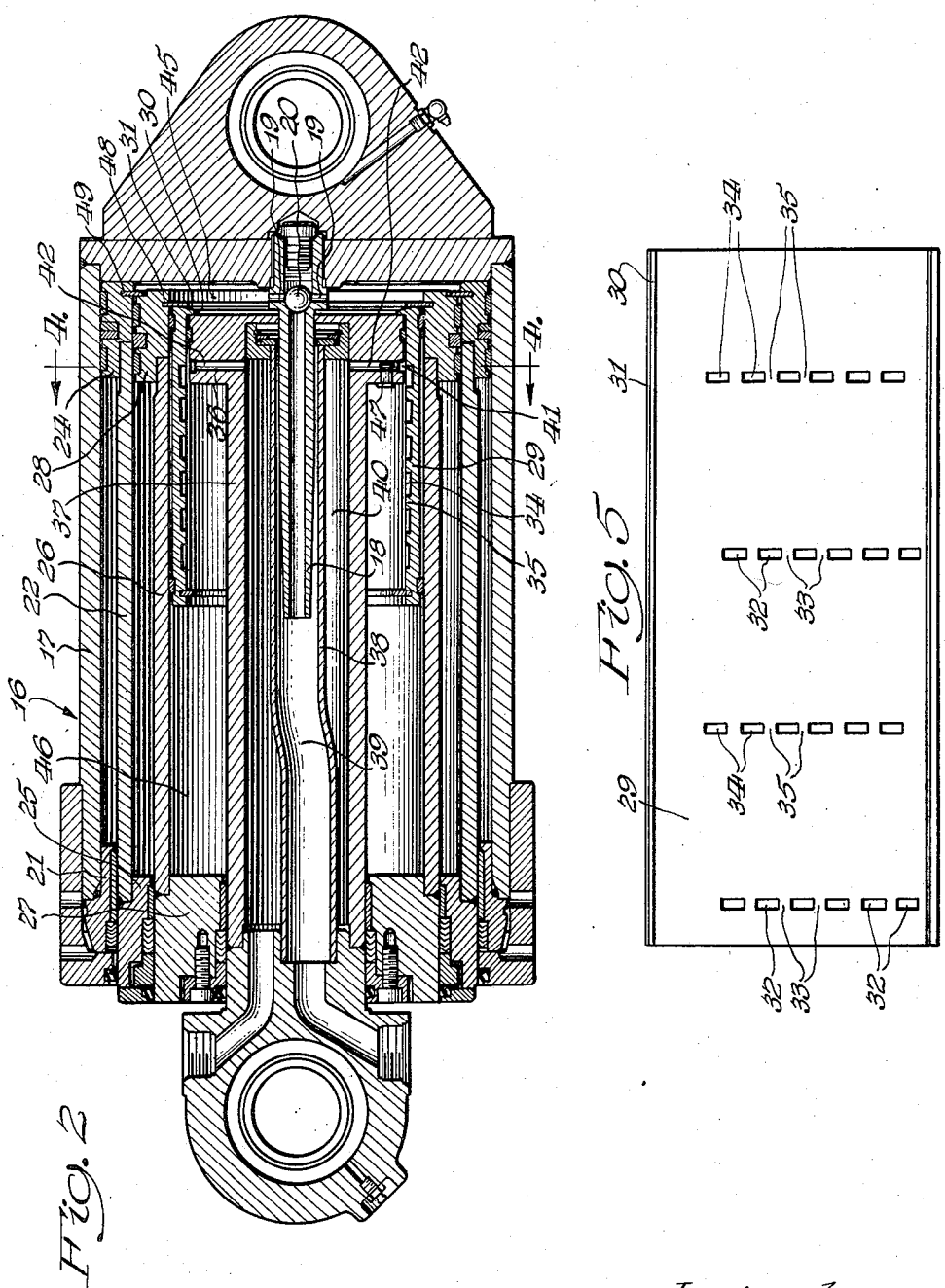

United States Patent Office 2,897,791
Patented Aug. 4, 1959

2,897,791
CUSHIONING MEANS FOR HYDRAULIC ACTUATING MEANS

James H. Routledge, Bellwood, Ill., assignor to International Harvester Company, a corporation of New Jersey Application January 24, 1957, Serial No. 636,102

4 Claims. (Cl. 121—46)

This invention relates to hydraulic actuating means and is primarily concerned with a cushioning means for a piston and cylinder assembly used to move an object.

An object of the invention is to provide a cushioning means for a cylinder and piston assembly used to move an object to prevent damage to the piston and cylinder assembly.

Another object of the invention is to provide a cushioning means for a cylinder and piston assembly wherein the cushioning action increases as the piston rod is moved out of the cylinder.

The foregoing and other objects of the invention will be apparent from the construction and arrangement illustrated in the accompanying drawings wherein:

Figure 1 is a side elevational view of a dump truck with the dump body in dumping position, Figure 2 is a longitudinal sectional view of the cylinder and piston assembly in retracted position, Figure 3 is a fragmentary longitudinal sectional view of the cylinder and piston assembly in fully extended position, Figure 4 is a cross sectional view taken on the line 4—4 of Figure 2, and Figure 5 is a view of the sleeve cut longitudinally of itself and rolled out flat to show two pairs of columns of recesses in staggered relation.

In the past a plurality of cylinder and piston assemblies have been used to raise and lower the dump body of a dump truck. These assemblies worked satisfactorily until the center of gravity of the dump body moved past the point of pivotal connection of the dump body to the truck. Also there was an increase of speed of the dump body as it moved to dumping position caused by a constant volume of fluid being pumped into the cylinders. Instructions are posted on the vehicle telling the operators to reduce engine speed or pull the control lever from power raise to hold when near full dump position but experience shows that they forget to do either of these things. Then there was a sudden jerking movement of the dump body which caused the piston rod to be torn loose from the piston when the piston struck the piston rod end of the cylinder and the piston bumped into the piston rod end of the cylinder so hard that the end of the cylinder was damaged. This caused the rod end of the cylinder to score the piston rod causing failure of the seals between the piston rod and the cylinder.

The invention proposes a cushioning means for the cylinder and piston assembly so as to overcome the difficulties set forth above. The invention comprises a sleeve slidably positioned in the cylinder and provided with a plurality of recesses in its inner surface spaced and decreasing in size longitudinally of the sleeve. A passage is provided in the piston and piston rod and extends from a location intermediate the ends of the piston for discharging the fluid from the cylinder and a circular groove is provided in the piston and a hole extends from the groove to the passage. When the center of gravity of the dump body moves past the point of pivotal connection of the dump body to the truck when moving toward dumping position the sleeve moves over the piston after engaging the rod end of the cylinder.

As the sleeve moves over the piston the fluid flows from the cylinder into the recesses into the hole and out the passage where it is discharged. This progressive reduction of movement of the piston in the sleeve is effective to prevent the piston rod from being torn loose from the piston and to prevent damage to the piston rod end of the cylinder.

In the drawings, 10 generally designates a truck having longitudinally extending horizontal chassis rails 11 each provided at its rear end with an upstanding apertured lug 12. A dump body 13 having a center of gravity positioned as at 14 is pivoted adjacent its rear end to the lugs 12 by pins 15. Hydraulic means 16 are provided to pivot the dump body 13 about pins 15 so that the contents thereof may be dumped or to lower the dump body onto the chassis rails 11. The hydraulic means 16 is comprised of a cylinder 17 having one end pivotally connected to the dump body 13 and a pipe 18 disposed in the cylinder and secured to said one end thereof. The pipe 18 has side apertures 19 and a ball 20 disposed in an enlarged space of the pipe so that the pipe and the apertures and the ball form a check valve. A stop means 21 is secured to the other end of the cylinder 17. A cylinder 22 is slidably mounted in the cylinder 17 for movement into and out of the cylinder 17 and has an outer stop means 24 at its inner end and an inner stop means 25 on its projecting end. A cylinder 26 is slidably mounted in the cylinder 22 and has an end 27 and has outer stop means 28 on its other end. A sleeve 29 is slidably positioned in the cylinder 26 and has one end disposed adjacent the inner end of the cylinder and has a circular flange 30 at the inner surface at said one end thereof and has a bevel 31 in the circular flange and said one end of the sleeve extending around the sleeve and the circular flange. A pair of diametrically opposed columns of recesses 32 are provided in the inner surface of the sleeve 29 and are arranged longitudinally of the sleeve and the recesses in each column decrease in depth and length from said one end of the sleeve toward the other end thereof leaving a plurality of elements 33 separating the recesses in each column. Another pair of diametrically opposed columns of recesses 34 are provided in the inner surface of the sleeve 29 and are arranged longitudinally of the sleeve and decrease in depth and length from said one end of the sleeve toward said other end thereof leaving a plurality of elements 35 separating the recesses and the columns of recesses 34 are spaced ninety degrees from the columns of recesses 32 and the elements 35 are disposed opposite the recesses of the columns 32 and the recesses of the columns 34 are disposed opposite the elements 33. A piston 36 is slidably disposed in the sleeve 29 and a hollow piston rod 37 is secured to the piston and slidably projects through the end 27 of cylinder 26 and its projecting end is pivotally connected to the chassis of the truck midway between the rails 11. A pipe 38 is fixedly secured in the piston rod 37 and forms a portion of a passage 39 extending through the piston 36 and the piston rod and the passage is in communication with the space between the piston and the pivoted end of the cylinder 17 and the piston rod end of the passage is also in communication with a source of fluid under pressure such as a pump and a reservoir containing a fluid such as oil. As passage 40 extends from a location intermediate the ends of the piston 36 through the piston rod and the piston rod end of the passage is in communication with the pump and the reservoir. The piston 36 is provided with a circular groove 41 intermediate its ends and a pair of aligned holes 42 extending from the groove to the passage 40 and another pair of aligned holes 43 extending from the groove to the passage and spaced ninety degrees from the holes 42. The holes 42 are in alignment with the columns of recesses 34 and the holes 43 are in alignment with the columns of recesses 32.

The mode of operation of the hydraulic means 16 is as follows: Assuming that the dump body 13 is in a horizontal position on the truck and it is desired to dump a boulder 44 out of the body. Oil is pumped into the passage 39 and flows into the pipe 18 and moves ball 20 toward the pivoted end of cylinder 17 and then flows through the apertures 19 into the space between the piston and the end of the cylinder and the pressure of the oil causes the cylinder 17 to be moved upwardly until stop means 21 engages stop means 24 then cylinders 17 and 22 move upwardly until stop means 25 engages stop means 28. Oil pressure in chamber 45 then causes cylinders 17, 22 and 26 to move upwardly with cylinder 26 sliding over the outer surface of sleeve 29. Oil in the chamber 46 flows into recesses 32 and 34 around the periphery of the piston 36 into groove 41 and holes 42 into passage 40 and then into the reservoir.

The pressure in chamber 46 will move sleeve 29 toward the non rod end of the cylinder 26 upon a sudden pull on the piston rod at a position of the sleeve intermediate the ends of the cylinder until overcome by pressure in the chamber 45 or until the stop ring on the sleeve engages the piston if the pressure in the chamber 45 is less than the pressure in the chamber 46. Progressive snubbing action occurs all through the stroke of the sleeve 29 in the cylinder 26 since the sleeve can move back and forth over the piston and pressure unbalance in chambers 45 and 46 determines the position of the sleeve on the piston in a feathering action after the sleeve and the piston have left the non rod end of the cylinder 26. It is assumed that the raise pressure will at all times keep the sleeve 29 engaging the non rod face of the piston until pressure peaks in chamber 46 become high enough to cause the sleeve to shift to become engaged against the rod face of the piston or a position of balanced pressures in chambers 45 and 46. When end 27 of cylinder 26 engages sleeve 29 the pressure in chamber 45 moves cylinders 17, 22 and 26 and sleeve 29 upwardly with the sleeve sliding over the piston. During the movement of the sleeve 29 over the piston 36 the flow of oil from chamber 46 is progressively restricted until the sleeve and cylinders 17, 22 and 26 are decelerated to a stop. In the full retracted position the sleeve 29 is shifted to a full by-pass position on the piston 36. When the sleeve 29 starts movement over the piston 36 the center of gravity 14 of the dump body has just moved to the right of pins 15 as shown in Figure 1 resulting in a sudden movement of the dump body. If the boulder 44 is being dumped it will cause a sudden movement as soon as it moves past pins 15 and still greater movement when it strikes the sloping end of the dump body. The sleeve 29 moving over the piston 36 provides a cushioning means to cushion the cylinder and piston assembly 16. Since the recesses 32 and 34 decrease in size from one end of the sleeve toward the other end thereof the cushioning action increases as the dump body 13 moves farther toward dumping position. The recesses in columns 32 and 34 are staggered so that there will always be flow from chamber 46 through the recesses and into holes 42 or 43 when the sleeve 29 is moving over the piston 36 during movement of the dump body 13 toward dumping position.

The elements 33 and 35 are provided so that there cannot be flow of oil between chambers 45 and 46.

To lower the dump body 13 from a dumping position to a horizontal position on the truck oil is discharged from the interior of the cylinders 17, 22 and 26 through the passage 39 to the reservoir and oil is pumped into the passage 40 and into holes 42 and then through a check valve 47 into the chamber 46. The piston 36 moves through the sleeve 29 until it contacts flange 30 and the sleeve then moves in the cylinder 26 until it contacts a stop means 48 on the cylinder and then cylinder 26 moves in cylinder 22 until it contacts a stop means 49 on cylinder 22 and then cylinder 22 moves in cylinder 17 until the inner end of cylinder 22 contacts the pivoted end of cylinder 17 and during this movement pipe 38 moves over pipe 18.

The piston rod 37 may be pivoted to the dump body 13 and cylinder 17 may be pivoted to the truck chassis 11 so that the piston moves through the sleeve after the sleeve has engaged the rod end of cylinder 26.

The cushioning means of the present invention could be used in the cylinder and piston assembly of airplane landing gears or on any kind of equipment where there is sudden movement of an object to which a cylinder and piston assembly is connected.

What is claimed is:

1. Cushioning means comprising a cylinder having both ends closed and having one end connected to a first object, a sleeve slidably positioned in the cylinder and provided with a plurality of recesses in its inner surface, a piston disposed in the sleeve, a piston rod secured to the piston and projecting through the other end of the cylinder and connected to a second object, the piston and piston rod being provided with a passage extending from a location intermediate the ends of the piston for discharging a fluid and the piston being provided with a circular groove in its periphery formed by a bounding wall and a plurality of holes extending from the bounding wall of the groove to the passage, the sleeve and piston moving relative to each other and each recess being successively in communication with the groove as the sleeve and piston move relative to each other and a chamber being formed between the piston and the sleeve and said other end of the cylinder and fluid flowing through the respective recess into the groove through the holes and out the passage as the piston and the sleeve move toward said other end of the cylinder.

2. Cushioning means comprising a cylinder having both ends closed and having one end connected to a first object, a sleeve slidably positioned in the cylinder and provided with a first column of recesses in the inner surface of the sleeve arranged longitudinally thereof leaving a first plurality of elements separating the recesses and a second column of recesses in the inner surface of the sleeve arranged longitudinally thereof leaving a second plurality of elements separating the recesses and spaced from the first column of recesses and the second plurality of elements being disposed opposite the recesses of the first column and the recesses of the second column being disposed opposite the first plurality of elements, a piston disposed in the sleeve, a piston rod secured to the piston and projecting through the other end of the cylinder and connected to a second object, the piston and piston rod being provided with a passage extending from a location intermediate the ends of the piston for discharging a fluid and the piston being provided with a circular groove in its periphery formed by a bounding wall and a first hole in the bounding wall of the groove extending from a location adjacent the first column of recesses to the passage and a second hole in the bounding wall of the groove extending from a location adjacent the second column of recesses to the passage, the sleeve and piston moving relative to each other and the recesses of the first and second columns being alternately in communication with the groove as the sleeve and piston move relative to each other and a chamber being formed between the piston and the sleeve and said other end of the cylinder and fluid flowing through the respective recess into the groove through the respective hole and out the passage as the piston and the sleeve move toward said other end of the cylinder.

3. Cushioning means comprising a cylinder having both ends closed and having one end connected to a first object, a sleeve slidably positioned in the cylinder and having one end disposed adjacent said one end of the cylinder and provided with a first column of recesses in the inner surface of the sleeve arranged longitudinally thereof and decreasing in size from said one end toward the other end leaving a first plurality of elements separating the recesses and a second column of recesses in the inner surface of the sleeve arranged longitudinally thereof and decreasing in size from said one end toward said other end leaving a second plurality of elements separating the recesses and spaced from the first column of recesses and the second plurality of elements being disposed opposite the recesses of the first column and the recesses of the second column being disposed opposite the first plurality of elements, a piston disposed in the sleeve, a piston rod secured to the piston and projecting through the other end of the cylinder and connected to a second object, the piston and piston rod being provided with a passage extending from a location intermediate the ends of the piston for discharging a fluid and the piston being provided with a circular groove and a first hole extending from a location adjacent the first column of recesses to the passage and a second hole extending from a location adjacent the second column of recesses to the passage, the sleeve and piston moving relative to each other and the recesses of the first and second columns being alternately in communication with the groove as the sleeve and piston move relative to each other and a chamber being formed between the piston and the sleeve and said other end of the cylinder and fluid flowing through the respective recess into the groove through the respective hole and out the passage as the piston and the sleeve move toward said other end of the cylinder.

4. Cushioning means comprising a cylinder having both ends closed and having one end connected to a first object, a sleeve slidably positioned in the cylinder and having one end disposed adjacent said one end of the cylinder and having a circular flange at the inner surface at said one end and a bevel in the circular flange and said one end and a first column of recesses in the inner surface of the sleeve arranged longitudinally thereof and decreasing in depth from said one end of the sleeve toward the other end thereof leaving a first plurality of elements separating the recesses and a second column of recesses in the inner surface of the sleeve arranged longitudinally thereof and decreasing in depth from said one end of the sleeve toward said other end thereof leaving a second plurality of elements separating the recesses and spaced from the first column of recesses and the second plurality of elements being disposed opposite the recesses of the first column and the recesses of the second column being disposed opposite the first plurality of elements, a piston disposed in the sleeve, a piston rod secured to the piston and projecting through the other end of the cylinder and connected to a second object, the piston and piston rod being provided with a first passage extending through the piston and in communication with the space in the cylinder between said one end of the cylinder and the piston for supplying fluid under pressure and a second passage extending from a location intermediate the ends of the piston for discharging the fluid and the piston being provided with a circular groove and a first hole extending from a location adjacent the first column of recesses to the second passage and a second hole extending from a location adjacent the second column of recesses to the second passage, the sleeve and piston moving relative to each other and the recesses of the first and second columns being alternately in communication with the groove as the sleeve and piston move relative to each other and a chamber being formed between the piston and the sleeve and said other end of the cylinder and fluid flowing through the respective recess into the groove through the respective hole and out the second passage as the piston and the sleeve move toward said other end of the cylinder.

References Cited in the file of this patent
UNITED STATES PATENTS

| 1,219,334 | Lower | Mar. 13, 1917 |
| 1,970,286 | Dunn | Aug. 14, 1934 |
| 2,363,142 | Reed | Nov. 21, 1944 |